UNITED STATES PATENT OFFICE.

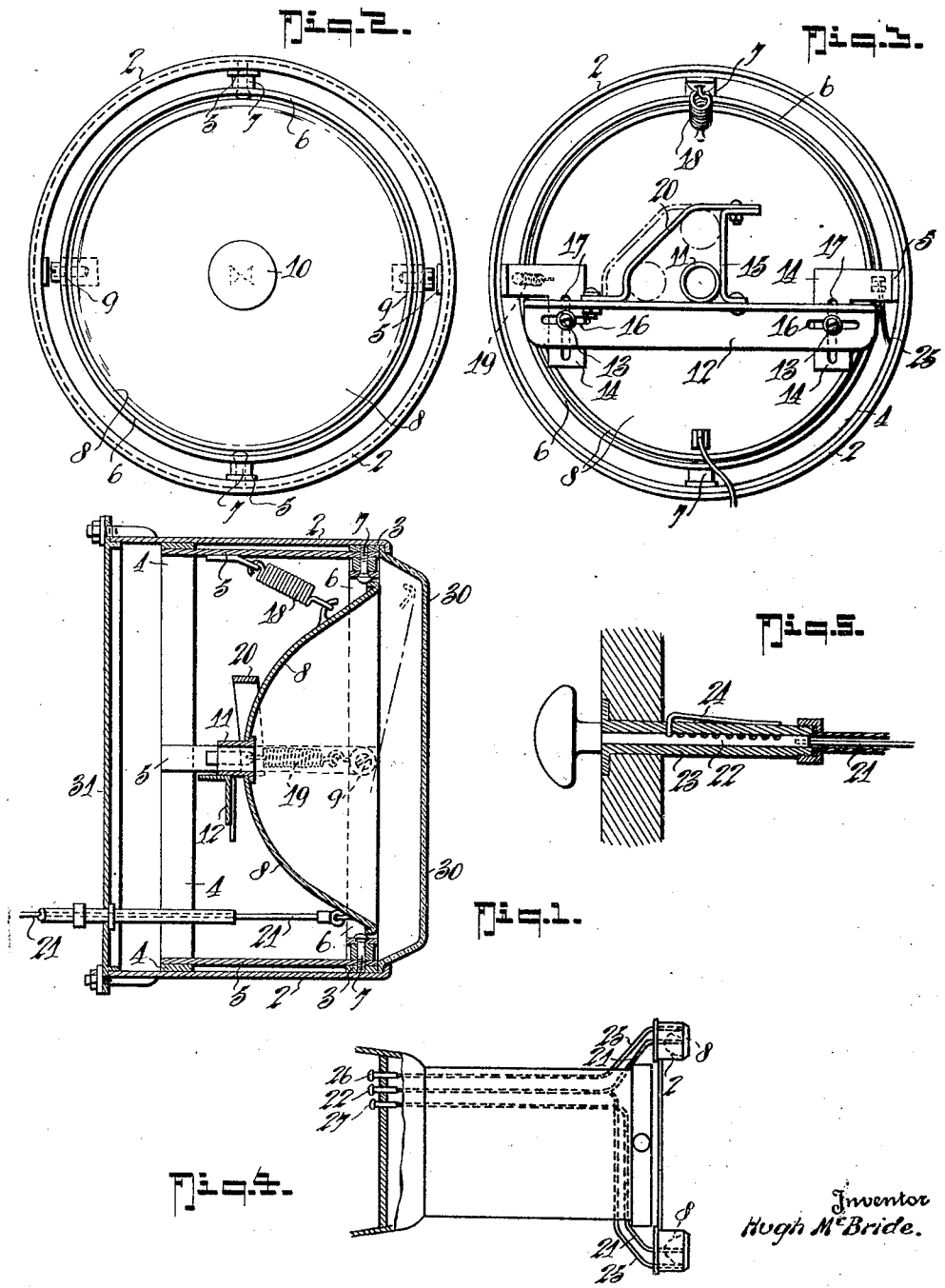

HUGH McBRIDE, OF CHILLIWACK, BRITISH COLUMBIA, CANADA.

AUTOMOBILE HEADLIGHT.

Application filed May 26, 1925, Serial No. 32,975, and in Canada April 25, 1925.

This invention relates to a means for angularly moving the headlights of an automobile to direct the beams downward on the road, as when approaching another vehicle, or to direct that of either lamp outward to the roadside as may be required.

These results are attained, not by moving each lamp body as a whole, as is usual, but by moving the reflector and its lamp, within the casing which remains stationary.

With these objects, each reflector with its lamp is mounted within the lamp casing on pivots to have a limited movement about a horizontal axis whereby the light beam may be tilted downward on the road from its normal focusing position when approaching another vehicle. The ring within which the reflector is so mounted is itself mounted to turn about a vertical axis from its normal focusing position toward the side of the road.

The downward tilting movement of the light beam, when applied to the two headlights of a car, are operated simultaneously from a single movement of the operator; but the lateral movement of either light beam directed to the side of the road is separately operable on each light and remains therefore a separate operating handle for each lamp.

Provision is also made that when the two light beams are depressed, as when approaching another vehicle, either one will be elevated to the normal position when directed to the roadside.

The invention is particularly described in the following specification, reference being made to the drawings by which it is accompanied, in which:

Fig. 1 is a vertical longitudinal section on the axis of the lamp.
Fig. 2, a front elevation.
Fig. 3, a back elevation.
Fig. 4, a small scale plan.
Fig. 5, an enlarged detail of the operating plunger.

In these drawings 2 represents the cylindrical casing of the lamp, within which the incandescent bulb 10 and its reflector 8 are carried within a removable frame composed of two rings, a front one 3 and back one 4. These rings are connected together to be parallel with one another by a number of distance strips 5.

Within the front ring 3 an inner ring 6 is concentrically supported to turn on pivots 7, the axis of which is substantially vertical, and within this inner ring 6 the reflector 8 is mounted on trunnion pins 9, the axis of which is at right angles to that of the pivots 7 and therefore substantially horizontal.

The axis of the lamp 10 and its reflector 8 can thus be moved in a vertical plane on the pivots 9 and in a horizontal plane on the pivots 7.

As it is desirable to limit the vertical tilt of the lamp 10 and its reflector 8 that its beam may not be angled upward beyond the normal position required, that is, to direct the beam on the road at from seventy-five to one hundred feet in front of the vehicle, an angle bar 12 is secured behind the reflector by small bolts 13 to brackets 14 secured to the distance strips 5 of the lamp frame, in a position to engage the socket 11 of the lamp 10. On this bar 12 is secured an upright 15 that will engage the lamp socket 11 and limit movement of the light beam at the position necessary to intersect that from the other lamp at the desired distance in front of the vehicle.

With this arrangement the light beams from both lamps may be turned downward to the road on approaching another vehicle, the sockets 11 being lifted off the bar 12, but they cannot be turned upward beyond the limit imposed as the socket 11 will be stopped by engagement with the cross bar 12. Similarly, the lamps being right and left, the right hand lamp may be turned outward to the roadside on the right; the socket 11 moving off the upright 15, but not inward beyond the focusing position and the left hand lamp may be turned to the roadside on the left but not inward beyond the focusing position, as the socket 11 of the lamp will be stopped against the upright 15 in each case.

To enable the light beams to be adjusted both horizontally and vertically to the desired normal focus in advance of the car, the bolts 13 by which the angle bar 12 is secured to the brackets 14, pass through horizontally elongated apertures 16 in the bar 12 and vertically elongated apertures 17 in the brackets 14. This allows of vertical adjustment of the bar 12 and lateral adjustment of the upright 15.

A spring 18 is connected between the upper edge of the reflector 8 and one of the members 5 of the frame which will tend to retain the socket 11 of the reflector against the horizontal bar 12, and a spring 19 is connected between one of the horizontal pivots 7 of the reflector, or between the ring in which it is mounted adjacent this pivot, and one of the brackets 14 or other part of the supporting frame that will tend to retain the socket of the lamp against the upright 15.

A guide 20 extends angularly downward from the upper end of the upright 15 to the cross bar 12 adjacent the desired limit of lateral movement of the socket 11. This guide 20 may be integral with and bent over from the upright 15 but is preferably, as shown in the drawing, connected to the upright and the bar 12 that it may be laterally adjusted to vary the lateral range.

The object of this is that when both lamps are depressed, as when meeting an approaching vehicle, it may be necessary to direct the lamp which is nearer the roadside, to the side of the road, but as the lamp, when so directed, should be raised to its normal elevation to illume the road further ahead than the depressed position allows. Thus when the depressed lamp is turned outward the socket of the outwardly turned lamp engages the guide 20 and slides down it to the level of the normal elevation on the bar 12.

These light directing movements may be operated from the instrument board of the vehicle in any convenient manner, either electrically or mechanically. In the drawings herewith they are shown as being mechanically effected by steel wires conducted in small tubes to the instrument board.

Depressing movement of the reflector 8 is effected by a wire 21 which is connected to the lower edge of the reflector 8 of each lamp and the two wires are conducted in small flexible tubes to the instrument board where they are connected together to a plunger 22 movable in a socket 23. The stem of this plunger has notches to engage the end of the spring 24 that will retain the stem in any desired position of movement, but will override the notches when sufficient pressure is applied.

Lateral movement of each headlight is effected by a similar wire 25 connected to the ring 6 of each lamp adjacent one of its pivots 9 and to the stem of a plunger 26 or 27 disposed one on each side of the depressing plunger 22. Thus the lamp beams may be depressed together and that of either lamp may be laterally turned outward.

The glass lens 30 of the lamp has a conical border to project the face of the lens beyond the forward edge of the lamp casing 2, which has an inwardly flanged retaining edge. The lens is preferably inserted from the back of the casing 2 before the supporting frame 3, 4, 5 of the reflector and lamp is introduced and the back 31 is in two halves that the electrical connections of the lamp need not be broken if it is required to remove the lamp from the casing.

Having now particularly described my invention, I hereby declare that what I claim as new and desire to be protected in by Letters Patent, is:

1. A dirigible headlight, comprising in combination, an outer casing, a ring frame removably secured within the casing, a ring concentrically supported within the front ring of the frame to be movable about a vertical axis, a reflector mounted within the inner concentric ring to be movable about a horizontal axis, said reflector having a lamp socket projecting rearwardly from it, a horizontal bar attached to the ring frame across the rear of the reflector with provision for vertical and horizontal adjustment in its attachment to the frame, said bar having an upright about its middle, the bar and its upright adapted to engage the lamp socket and support the reflector in its normal position of vertical and lateral adjustment, springs normally holding the socket in contact with the bar and its upright, a guide member extending angularly from the upper end of the upright to the horizontal bar, means connected to the reflector and operable from the instrument board of the vehicle for directing the light beam downward on the road and similar means connected to the ring within which the reflector is mounted for directing the light beam angularly to one side of the road.

2. A dirigible headlight, comprising in combination, an outer casing, a ring pivotally mounted within one end to move about a vertical axis, a reflector having at its center a socket for the lamp, said reflector mounted within said ring to be movable about a horizontal axis, means for engaging the lamp socket for limiting the movements of the reflector and of the ring in which it is mounted, means for separately operating the two movements from the instrument board of the vehicle and means whereby the position of the said socket engaging means may be adjusted vertically or laterally or both vertically and laterally, and said movement limiting means including a horizontal upward movement limiting bar and lateral movement limiting bars for preventing movement in one direction beyond the normal position while permitting a degree of movement in the remaining direction only.

3. A dirigible headlight, comprising in combination, an outer casing, a ring frame removably secured within the casing, a ring concentrically supported within the front ring of the frame to be movable about a vertical axis, a reflector mounted within the inner concentric ring to be mounted about a horizontal axis, said reflector having a rearward projection, a horizontal bar attached to the ring frame across the rear of the reflector with provision for vertical and horizontal adjustment in its attachment to the frame, said bar having an upright about its middle, the bar and its upright adapted to engage the rearward projection and support the reflector in its normal position of vertical and lateral adjustment, springs normally holding the rearward projection in contact with the bar and its upright, a guide member extending angularly from the upper end of the upright to the horizontal bar, means connected to the reflector and operable from the instrument board of the vehicle for directing the light beam downwardly on the road, and similar means connected to the ring within which the reflector is mounted for directing the light beam angularly to one side of the road.

In testimony whereof I affix my signature.

HUGH McBRIDE.